United States Patent
Hu et al.

(10) Patent No.: US 7,898,651 B2
(45) Date of Patent: Mar. 1, 2011

(54) METHODS AND APPARATUS FOR INSPECTING AN OBJECT

(75) Inventors: Oingyang Hu, Clifton Park, NY (US); Donald Wagner Hamilton, Burnt Hills, NY (US); Kevin George Harding, Nishkayuna, NY (US); Joseph Benjamin Ross, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 364 days.

(21) Appl. No.: 11/256,866

(22) Filed: Oct. 24, 2005

(65) Prior Publication Data

US 2007/0091320 A1    Apr. 26, 2007

(51) Int. Cl.
G01N 21/00 (2006.01)
(52) U.S. Cl. ................................. 356/237.2; 356/237.3
(58) Field of Classification Search ......... 356/601–605, 356/237.2–237.6; 250/237 G; 382/154, 382/286
See application file for complete search history.

(56) References Cited

U.S. PATENT DOCUMENTS

| | | | |
|---|---|---|---|
| 4,585,947 A | | 4/1986 | Liptay-Wagner et al. |
| 4,686,374 A | | 8/1987 | Liptay-Wagner et al. |
| 5,175,601 A | * | 12/1992 | Fitts ........................... 356/604 |
| 5,307,151 A | | 4/1994 | Hof et al. |
| 5,471,308 A | | 11/1995 | Zeien |
| 5,581,352 A | * | 12/1996 | Zeien ......................... 356/604 |
| 5,636,025 A | | 6/1997 | Bieman et al. |
| 6,028,671 A | * | 2/2000 | Svetkoff et al. ............. 356/368 |
| 6,028,672 A | * | 2/2000 | Geng .......................... 356/602 |
| 6,064,759 A | | 5/2000 | Buckley et al. |
| 6,438,272 B1 | | 8/2002 | Huang et al. |
| 6,456,405 B2 | * | 9/2002 | Horikoshi et al. ............... 359/9 |
| 6,639,685 B1 | | 10/2003 | Gu et al. |
| 6,678,057 B2 | | 1/2004 | Harding et al. |
| 6,788,210 B1 | | 9/2004 | Huang et al. |
| 6,806,983 B2 | * | 10/2004 | Long ........................... 359/35 |
| 6,876,459 B2 | | 4/2005 | Tu et al. |
| 7,525,669 B1 | * | 4/2009 | Abdollahi ................... 356/603 |
| 2002/0014577 A1 | | 2/2002 | Ulrich et al. |

(Continued)

FOREIGN PATENT DOCUMENTS

DE    198 52 149 A1    5/2000

(Continued)

OTHER PUBLICATIONS

EP Search Report, App. No. 06255441.5 (Feb. 12, 2007).

(Continued)

Primary Examiner—Gregory J Toatley
Assistant Examiner—Tri T Ton
(74) Attorney, Agent, or Firm—William Scott Andes, Esq.; Armstrong Teasdale LLP

(57) ABSTRACT

A method for inspecting an object includes emitting light from at least one of a liquid crystal display (LCD) device and a liquid crystal on silicon (LCOS) device, phase-shifting light emitted from at least one of the LCD device and the LCOS device, projecting the phase-shifted light onto a surface of an object, receiving light reflected from the object surface with an imaging sensor, and analyzing the light received by the imaging sensor to facilitate inspecting at least a portion of the object.

13 Claims, 3 Drawing Sheets

U.S. PATENT DOCUMENTS

| | | | |
|---|---|---|---|
| 2003/0112447 A1* | 6/2003 | Harding et al. | ............. 356/603 |
| 2005/0111726 A1 | 5/2005 | Hackney et al. | |
| 2007/0115484 A1 | 5/2007 | Huang et al. | |

FOREIGN PATENT DOCUMENTS

| | | |
|---|---|---|
| EP | 1 351 034 A2 | 10/2003 |
| WO | WO 93/08448 | 4/1993 |
| WO | WO 96/27115 | 9/1996 |
| WO | 99/34301 | 7/1999 |
| WO | 01/20539 A1 | 3/2001 |

OTHER PUBLICATIONS

Hu, Qingying, et al., Shiny Parts Measurement Using Color Separation, 8 page abstract, GE GRC, Schenectady, Ny (Oct. 22, 2005).

* cited by examiner

METHODS AND APPARATUS FOR INSPECTING AN OBJECT

BACKGROUND OF THE INVENTION

This application relates generally to inspecting objects, and more specifically to methods and apparatus for inspecting objects using a light measurement system.

Objects are sometimes inspected, for example, to determine a size and/or shape of all or a portion of the object and/or to detect defects in the object. For example, some gas turbine engine components, such as turbine or compressor blades, are inspected to detect fatigue cracks that may be caused by vibratory, mechanical, and/or thermal stresses induced to the engine. Moreover, and for example, some gas turbine engine blades are inspected for deformations such as platform orientation, contour cross-section, bow and twist along a stacking axis, thickness, and/or chord length at given cross-sections. Over time, continued operation of the object with one or more defects may reduce performance of the object and/or lead to object failures, for example, as cracks propagate through the object. Accordingly, detecting defects of the object as early as possible may facilitate increasing the performance of the object and/or reducing object failures.

To facilitate inspecting objects, at least some objects are inspected using a light measurement system that projects a structured light pattern onto a surface of the object. The light measurement system images the structured light pattern reflected from the surface of the object and then analyzes the deformation of the reflected light pattern to calculate the surface features of the object. More specifically, during operation, the object to be inspected is typically coupled to a test fixture and positioned proximate to the light measurement system. A light source is then activated such that emitted light illuminates the object to be inspected. However, a resultant image of the object may include noise caused by multiple bounce reflections of the emitted light. Such noise may result in reduced image quality and poor measurement results, possibly leading to an incorrect interpretation of surface features of the object. For example, light reflected off of prismatic surfaces of the object may cause multiple bounce reflections. Moreover, and for example, multiple bounce reflections may be caused by inter-reflections between the object and portions of the test fixture illuminated by the light source. For example, multiple bounce reflections may be caused if the test fixture has a shape or finish that casts reflections on the object, and/or if the object has a relatively mirror-like finish that reflects an image of the test fixture.

BRIEF DESCRIPTION OF THE INVENTION

In one aspect, a method is provided for inspecting an object. The method includes emitting light from at least one of a liquid crystal display (LCD) device and a liquid crystal on silicon (LCOS) device, phase-shifting light emitted from at least one of the LCD device and the LCOS device, projecting the phase-shifted light onto a surface of an object, receiving light reflected from the object surface with an imaging sensor, and analyzing the light received by the imaging sensor to facilitate inspecting at least a portion of the object.

In another aspect, a method is provided for inspecting an object. The method includes emitting a first sinusoidal fringe pattern of light from at least one of a liquid crystal display (LCD) device and liquid crystal on silicon (LCOS) device, emitting a second sinusoidal fringe pattern of light from at least one of the LCD device and the LCOS device, wherein the second sinusoidal fringe pattern is phase-shifted with respect to the first sinusoidal fringe pattern, projecting the first and second sinusoidal fringe patterns onto a surface of the object, receiving light reflected from the object surface using the imaging sensor, and analyzing the light received by the imaging sensor to facilitate inspecting at least a portion of the object.

In another aspect, a structured light measurement system for inspecting an object includes at least one of a liquid crystal display (LCD) device and a liquid crystal on silicon (LCOS) device configured to project structured light onto a surface of the object, and a computer operatively connected to the at least one of the LCD device and the LCOS device. The computer is configured to phase-shift light emitted from the at least one of the LCD device and the LCOS device. The system also includes an imaging sensor configured to receive structured light reflected from the object surface.

DETAILED DESCRIPTION OF THE INVENTION

Figure 1:
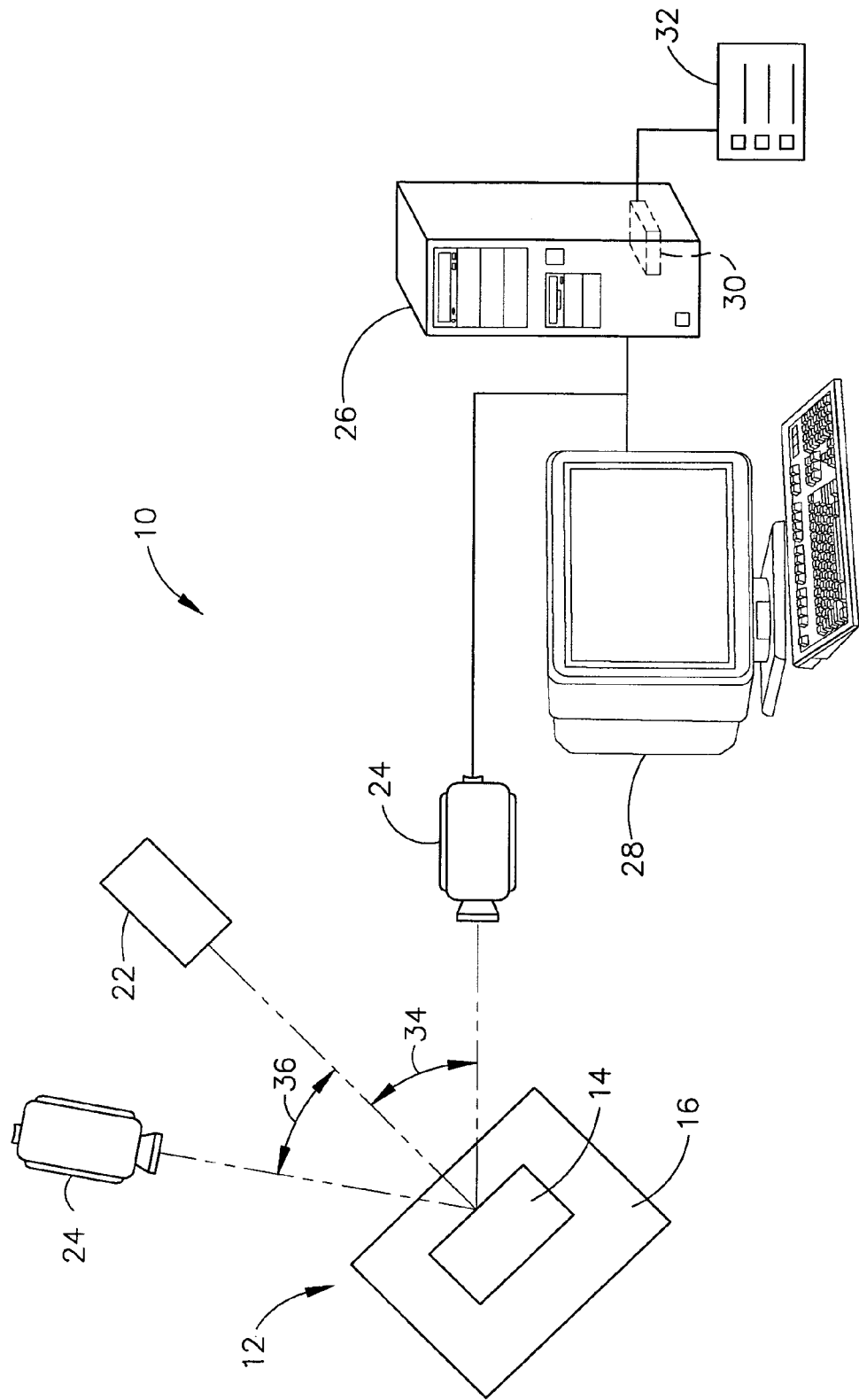
FIG. 1 is a block diagram of an exemplary embodiment of a structured light measurement system.

FIG. 1 is a block diagram of an exemplary embodiment of a structured light measurement system 10 that is used to measure a plurality of surface features of an object 12. For example, system 10 may be used to inspect and determine surfaces of object 12, wherein the surfaces may include features such as tilts, bends, twists, and/or warps when compared to a model representative of object 12.

In the exemplary embodiment, object 12 is a rotor blade, such as, but not limited to, a compressor or a turbine blade utilized in a turbine engine. Accordingly, and in the exemplary embodiment, object 12 includes an airfoil 14 extending outwardly from a platform 16. While the following description is directed to inspecting gas turbine engine blades, one skilled in the art will appreciate that inspection system 10 may be utilized to improve structured light imaging for any object.

System 10 also includes a structured light source 22 that is a liquid crystal display (LCD) projector and/or a liquid crystal on silicon (LCOS) projector. Although other patterns may be used, in some embodiments light source 22 projects a sinusoidal fringe pattern onto object 12. System 10 also includes one or more imaging sensors 24 that receive structured light reflected from object 12. In the exemplary embodiment, imaging sensor 24 is a camera that receives and creates images using structured light reflected from object 12, although other imaging sensors 24 may be used. One or more computers 26 are operatively connected to imaging sensors 24 to process images received therefrom, and a monitor 28 may be utilized to display information to an operator. In one embodiment, computer(s) 26 include a device 30, for example, a floppy disk drive, CD-ROM drive, DVD drive, magnetic optical disk (MOD) device, and/or any other digital device including a network connecting device such as an Ethernet device for reading instructions and/or data from a computer-readable medium 32, such as a floppy disk, a CD-ROM, a DVD, and/or another digital source such as a network or the Internet, as well as yet to be developed digital means. In another embodiment, computer(s) 26 execute instructions stored in firmware (not shown). Computer(s) 26 are programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

Figure 2:
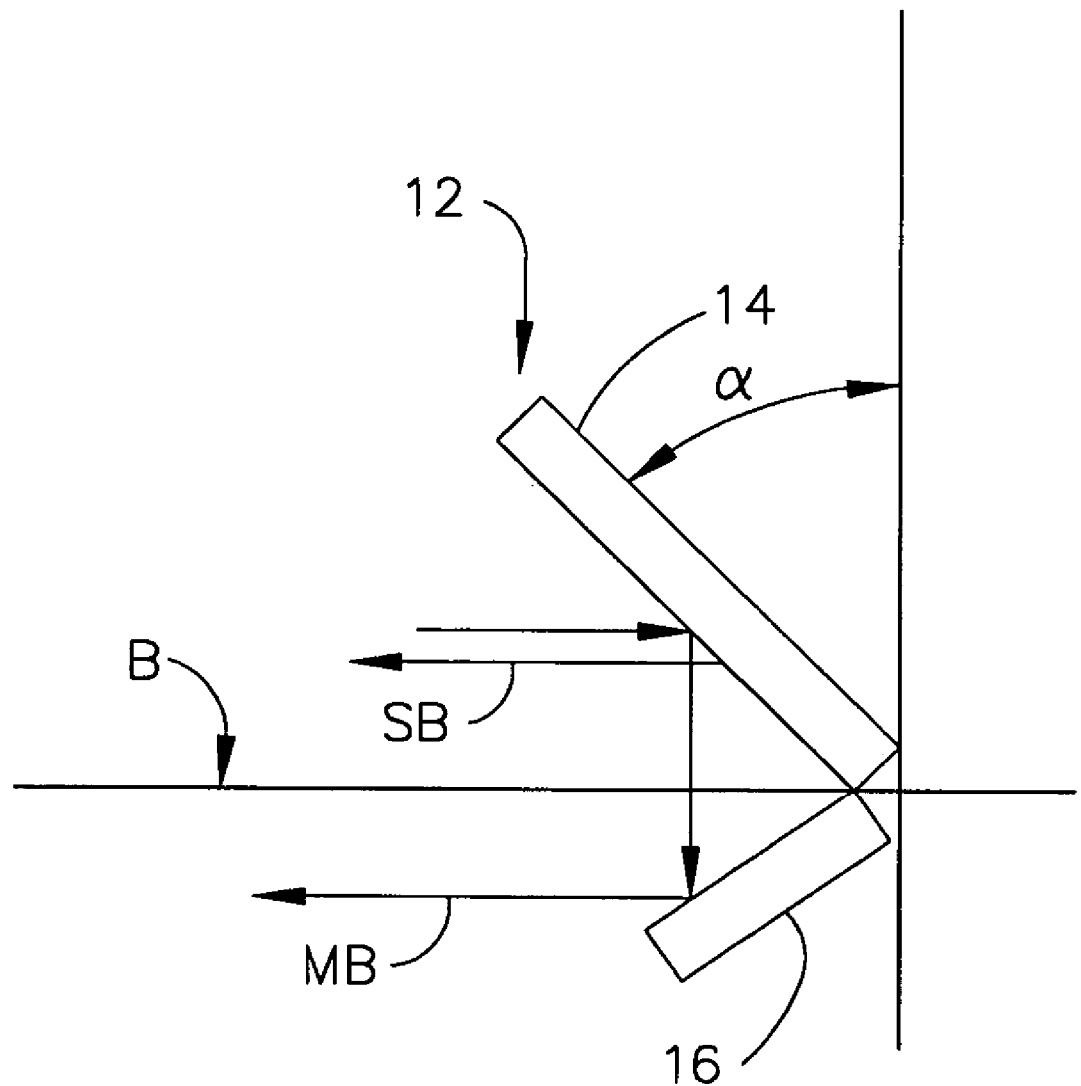
FIG. 2 is a side sectional view of an object under inspection, illustrating single and multiple bounce light paths.

FIG. 2 is a side sectional view of object 12. During operation, an object to be inspected, for example object 12, is coupled to a test fixture (not shown) and positioned proximate to system 10. In some embodiments, object 12 is orientated relative to light source 22 (shown in FIG. 1) with an angle α of orientation that enables a view to be presented to imaging sensors 24 (shown in FIG. 1) such that a plane β defined by light source 22 and imaging sensors 24 substantially bisects one or more prismatic features of object 12. For example, in the exemplary embodiment, airfoil 14 and platform 16 each define a prismatic feature of object 12.

Light source 22 is then activated causing emitted light to illuminate object 12. Imaging sensors 24 obtain an image of the emitted light pattern projected onto object 12. However, a resultant image of object 12 may include noise caused by multiple bounce reflections of the emitted light. Such noise may result in a reduced image quality and poor measurement results, possibly leading to an incorrect interpretation of surface features of object 12. For example, light reflected off of prismatic surfaces (e.g., intersecting surfaces of airfoil 14 and platform 16) of object 12 may cause multiple bounce reflections, as illustrated in FIG. 2. Directly reflected light paths, sometimes referred to as single bounce reflections, are indicated as SB in FIG. 2, and multiple bounce reflections are indicated as MB in FIG. 2. Moreover, and for example, multiple bounce reflections MB may be caused by inter-reflections between object 12 and portions of the test fixture illuminated by light source 22. For example, multiple bounce reflections MB may be created if the test fixture has a shape or finish that casts reflections on object 12, and/or if object 12 has a relatively mirror-like finish that reflects an image of the test fixture.

To identify features of object 12 and/or multiple bounce reflections MB, computer(s) 26 are operatively connected to light source 22 and configured to phase shift light emitted from light source 22. More specifically, computer(s) 26 change the initial phase of the pattern of light emitted by light source 22, and imaging sensor 24 captures the resulting sequential images of different phase. Computer(s) 26 then analyzes the light reflected from object 12 to facilitate inspecting object 12, such as, but not limited to, identifying reflections from single bounce SB light and/or multiple bounce MB light, identifying a surface texture, identifying a surface orientation, identifying a material used in fabricating object 12, determining a platform orientation, determining a contour cross-section, determining a bow, determining a twist, determining a thickness, determining a chord length, determining a shim, and/or determining an edge of object 12. In some embodiments, computer(s) 26 perform phase wrapping and/or unwrapping on light reflected from object 12 and received by imaging sensor 24 to determine a phase map. Moreover, in some embodiments, computer(s) 26 calculate a three-dimensional shape, sometimes referred to as a three-dimensional point cloud, of at least a portion of object 12 using the determined phase map. In some embodiments, system 10 includes a plurality of imaging sensors 24, each orientated differently with respect to object 12, to facilitate receiving light reflected from object 12 at different angles 34 and 36. Each of the plurality of imaging sensors 24 may receive light reflected from object 12 at a different phase shift, or each imaging sensor 24 may receive a sequence of images of different phase simultaneously, to facilitate inspecting object 12. For example, multiple images from different angles may facilitate determining an edge of object 12 using known edge detection methods, such as, but not limited to, edge detecting methods as described in U.S. Pat. No. 6,876,459.

Although computer(s) 26 are described herein as performing various functions, such as phase-shifting light emitted from light source 22 and analyzing light received by imaging sensors 24, it should be understood that any of these functions may be performed by other computers. For example, in some embodiments, phase shifting of light emitted from light source 22 is performed by a computer (not shown) that is a component of light source 22. Moreover, and for example, in some embodiments, analyzing light received by imaging sensors 24 is performed by a computer (not shown) that is a component of light source 22.

Figure 3:
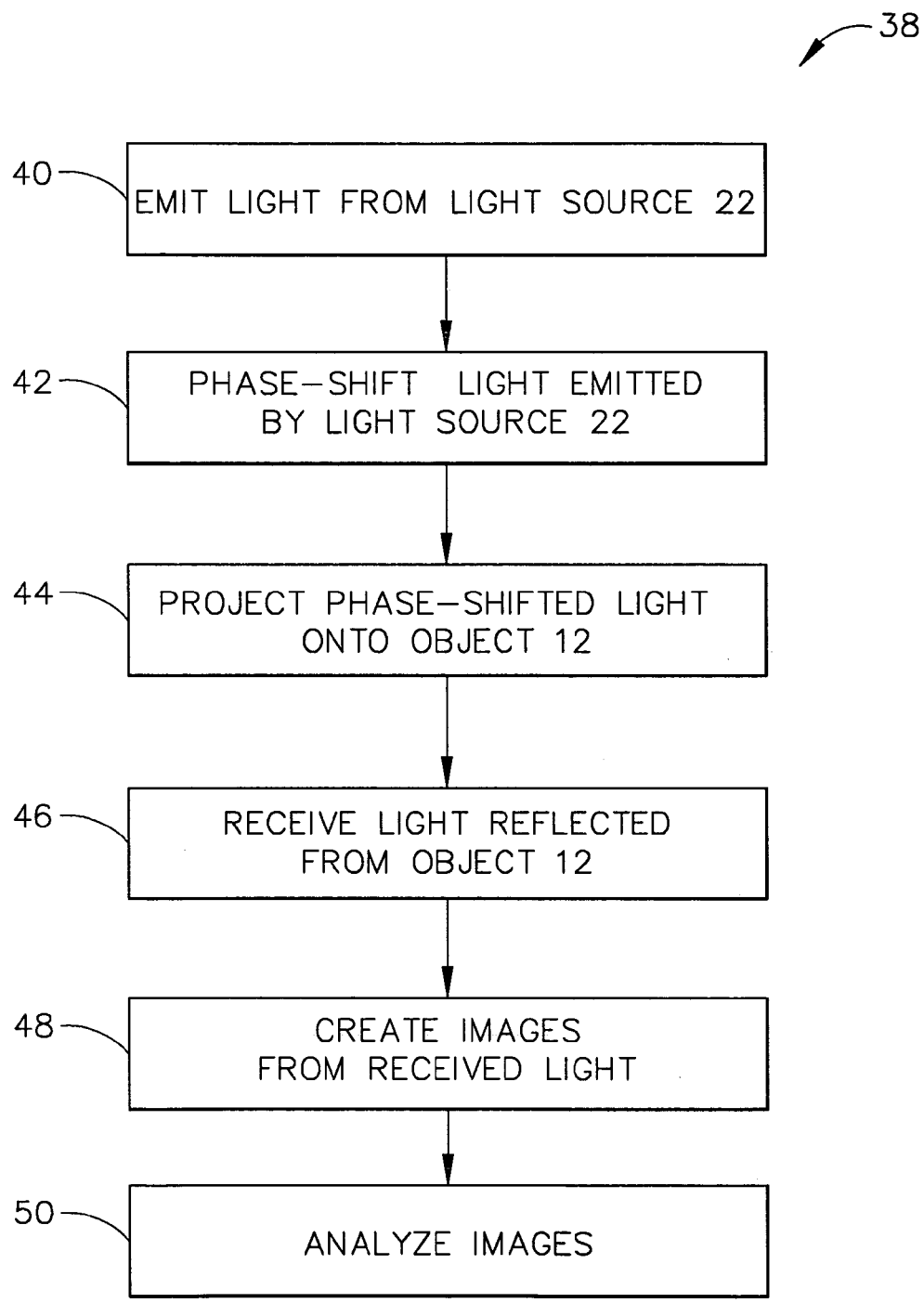
FIG. 3 is a flow chart illustrating an exemplary method for inspecting an object using the structured light measurement system shown in FIG. 1.

FIG. 3 is a flow chart illustrating an exemplary embodiment of a method 38 for inspecting object 12 (shown in FIGS. 1 and 2) using structured light measurement system 10 (shown in FIG. 1). Method 38 includes emitting 40 light from light source 22 and phase-shifting 42 light emitted from light source 22. For example, in some embodiments a first pattern of light is emitted by light source 22, and a series of other patterns of light emitted by light source 22 are phase-shifted with respect to the first pattern and emitted by light source 22. In some embodiments, emitting 40 light from light source 22 includes emitting a sinusoidal fringe pattern of light. Moreover, in some embodiments, light source 22 (for example using a computer that forms a component of light source 22) is used to phase-shift 42 light emitted therefrom. The phase-shifted patterns of light are projected 44 onto a surface of object 12. Light reflected from object 12 is received 46 by imaging sensor(s) 24 and images are created 48 therefrom using imaging sensor 24 and/or computer 26. The images are then analyzed 50 to identify 52 single bounce reflections SB, multiple bounce reflections MB, and/or features of object 12.

For example, reflections from single bounce SB light, multiple bounce MB light, or other variations, are readily identified and selectively extracted from the images using conventional image processing techniques, such as, but not limited to, subtraction or difference imaging between two images, masking of certain areas of an image, as well as correlations of image information. For example, it is known that if two or more. images of object 12 are obtained and are correlated such that they have common reference points or are from the same position and orientation, digital processing techniques permit one image to be "subtracted" from the other, so to obtaining a resulting difference image. This resulting difference image includes only information on those regions in the field of view which have changed between the first and second images. Moreover, with prior knowledge of the shape or configuration of object 12, or two or more images, specific regions in an image known to contain erroneous or irrelevant information may be digitally masked or blocked from further processing. For example, using subtraction techniques, regions of an image containing background can be identified in a difference image, and then utilized to mask out background regions in subsequent or current or subsequent images. Similarly, using known information or multiple images, an image of object 12 undergoing measurement may be correlated or registered to a stored reference image, facilitating identification of differences between object 12 and a representation of object 12.

Moreover, and for example, features of object 12, such as, but not limited to, surface texture, surface orientation, and a material used in fabricating object 12 can be readily identified from the image created by light reflected from the object using conventional image processing techniques, such as, but not limited to, phase-shifting techniques. In some embodiments, identifying features of object 12 includes, but is not limited to, identifying a surface texture, identifying a surface orientation, identifying a material used in fabricating object 12, determining a platform orientation, determining a contour cross-section, determining a bow, determining a twist, determining a thickness, determining a chord length, determining a shim, and/or determining an edge of object 12.

The above-described structured light measurement system 10 may facilitate inspecting object 12 more quickly and efficiently. More specifically, by phase-shifting light projected onto object 12, multiple images of object 12 can be analyzed to inspect object 12. Accordingly, multiple bounce reflections MB and/or features of object 12 can be determined using light reflected from object 12. Moreover, structured light measurement system 10 may facilitate identifying, reducing, and/or eliminating image noise, such as, but not limited to, multiple bounce reflections MB, simultaneously with determining features of object 12. A technical effect of the methods and systems described and/or illustrated herein includes facilitating identifying, reducing, and/or eliminating image noise, such as, but not limited to, multiple bounce reflections MB, simultaneously with determining features of object 12.

Although the systems and methods described and/or illustrated herein are described and/or illustrated with respect to gas turbine engine components, and more specifically an engine blade for a gas turbine engine, practice of the systems and methods described and/or illustrated herein is not limited to gas turbine engine blades, nor gas turbine engine components generally. Rather, the systems and methods described and/or illustrated herein are applicable to any object.

Exemplary embodiments of systems and methods are described and/or illustrated herein in detail. The systems and methods are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the assemblies and methods described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for inspecting an object, said method comprising:
    coupling a computer to at least one of a liquid crystal display (LCD) device, a liquid crystal on silicon (LCOS) device, and at least one imaging sensor;
    emitting light from at least one of the liquid crystal display (LCD) device and the liquid crystal on silicon (LCOS) device in a sinusoidal fringe pattern;
    controlling the fringe pattern using a computer;
    phase-shifting the light emitted from at least one of the LCD device and the LCOS device;
    projecting the phase-shifted sinusoidal fringe pattern of light onto a surface of the object that reflects light;
    receiving light reflected from the surface of the object with the imaging sensor;
    determining a phase map of the object; and
    analyzing the light received by the imaging sensor by identifying multiple bounce reflections based on light received by the imaging sensor to facilitate substantially reducing image noise in the light received from the surface of the object to further facilitate inspecting at least a portion of the object.

2. A method in accordance with claim 1 wherein phase-shifting comprises phase-shifting light emitted from at least one of the LCD device and the LCOS device using at least one of the LCD device and the LCOS device.

3. A method in accordance with claim 1 wherein receiving light reflected from the surface of the object comprises:
    receiving light reflected from the surface of the object using a first imaging sensor; and
    receiving light reflected from the surface of the object using a second imaging sensor oriented differently with respect to the object than the first imaging sensor.

4. A method in accordance with claim 3 wherein analyzing the light received by the imaging sensor comprises determining an edge of the object using light received by the first and second imaging sensors.

5. A method in accordance with claim 1 wherein analyzing light received by the imaging sensor comprises identifying at least one of a surface texture, a surface orientation, and a material used in fabricating the object based on light received by the imaging sensor.

6. A method in accordance with claim 1 wherein analyzing light received by the imaging sensor comprises calculating a three-dimensional shape of at least a portion of the object.

7. A method in accordance with claim 6 wherein the object is a rotor blade, said method further comprising determining at least one of a platform orientation, a contour cross-section, a bow, a twist, a thickness, a chord length, a shim, and an edge of the rotor blade based on the calculated three-dimensional shape of at least a portion of the rotor blade.

8. A method for inspecting an object, said method comprising:
    coupling a computer to at least one of a liquid crystal display (LCD) device, a liquid crystal on silicon (LCOS) device, and at least one imaging sensor;
    emitting a first sinusoidal fringe pattern of light from at least one of the liquid crystal display (LCD) device and the liquid crystal on silicon (LCOS) device;
    emitting a second sinusoidal fringe pattern of light from at least one of the LCD device and the LCOS device, wherein the second sinusoidal fringe pattern is phase-shifted with respect to the first sinusoidal fringe pattern;
    controlling the first fringe pattern and the second fringe pattern using a computer;
    projecting the first fringe pattern and the second fringe pattern onto a surface of the object that reflects light;
    receiving light reflected from the surface of the object using the imaging sensor;
    determining a phase map of the object; and
    analyzing the light received by the imaging sensor by identifying multiple bounce reflections based on light received by the imaging sensor to facilitate substantially reducing image noise in the light received from the surface of the object to further facilitate inspecting at least a portion of the object.

9. A method in accordance with claim 8 wherein receiving light reflected from the surface of the object comprises:

receiving light reflected from the surface of the object using a first imaging sensor; and receiving light reflected from the surface of the object using a second imaging sensor oriented differently with respect to the object than the first imaging sensor.

10. A method in accordance with claim 9 wherein analyzing the light received by the imaging sensor comprises determining an edge of the object using the light received by the first and second imaging sensors.

11. A method in accordance with claim 8 wherein analyzing the light received by the imaging sensor comprises identifying at least one of a surface texture, a surface orientation, and a material used in fabricating the object based on the light received by the imaging sensor.

12. A method in accordance with claim 8 wherein analyzing the light received by the imaging sensor comprises calculating a three-dimensional shape of at least a portion of the object.

13. A method in accordance with claim 12 wherein the object is a rotor blade, said method further comprising determining at least one of a platform orientation, a contour cross-section, a bow, a twist, a thickness, a chord length, a shim, and an edge of the rotor blade based on the calculated three-dimensional shape of the rotor blade.

* * * * *